Aug. 13, 1968     L. MÜLLER     3,396,980
CLAMPING DEVICE FOR CLAMPING A TUBULAR MEMBER
TO A PILE DRIVING DEVICE

Filed May 6, 1965     2 Sheets-Sheet 2

Inventor:
LUDWIG MÜLLER
By Hane and Nydick
ATTORNEYS though only a very short distance, with the result that wedge 3a will press pressure members 4a and 4b outwardly in the direction of arrows d. The displacement of plunger 2b in the direction of arrow c effects a simultaneous displacement of cylinder 2a and wedge 3b in the direction of arrow e.

United States Patent Office 3,396,980
Patented Aug. 13, 1968

3,396,980
CLAMPING DEVICE FOR CLAMPING A TUBULAR MEMBER TO A PILE DRIVING DEVICE
Ludwig Muller, Heinrich-Heine-Strasse 44–46, 355 Marburg an der Lahn, Germany
Filed May 6, 1965, Ser. No. 453,780
Claims priority, application Germany, May 8, 1964, M 60,918
8 Claims. (Cl. 279—2)

ABSTRACT OF THE DISCLOSURE

There is shown a clamping device for clamping tubular pile shafts to a pile driving device particularly to a driving device of the vibratory type. The clamping device permits the application of a substantially centered driving force to the shaft to be driven within a wide range of diameters of such shafts. Such substantially centered driving force is obtained by means of inner and outer clamping members movable into and out of clamping engagement with the pile shaft by operation of actuating members simultaneously moving the inner and outer clamping members.

Figure 1:
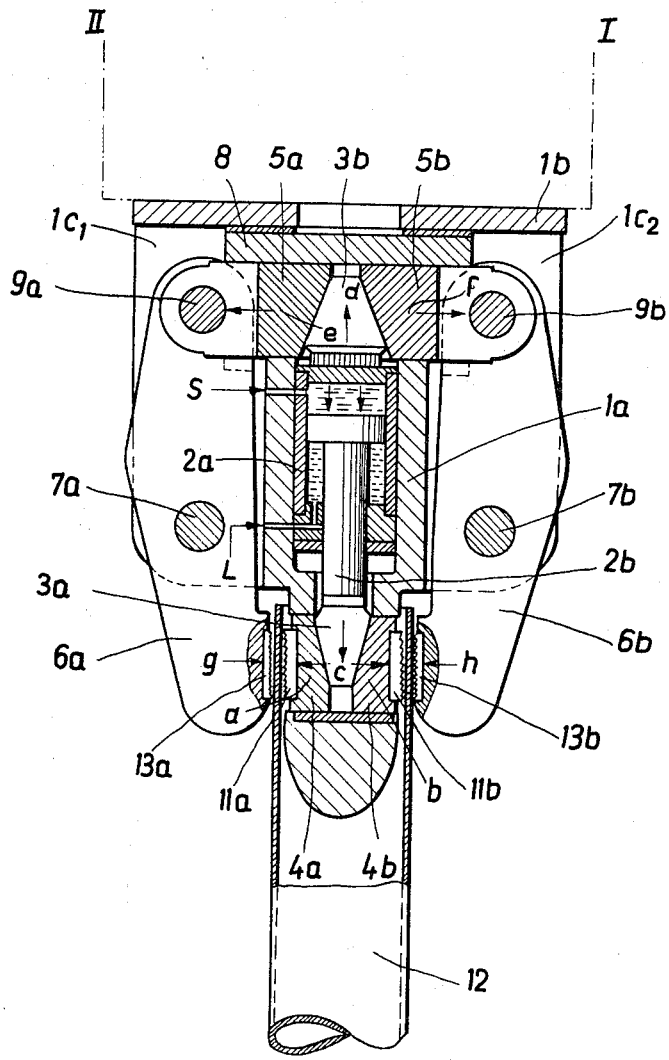

The invention relates to devices for clamping tubular members to be rammed or driven into the ground such as pile shafts, etc., by means of a power drive means, and particularly to a device for clamping pile shafts or similar tubular members to pile driving devices especially of the vibrating type.

There are known clamping devices of the general kind above referred to in which the tubular member to be driven into the ground is clamped to the vibrating driving device by inserting the wall of the member to be driven between the jaws of a clamping device and then pressing the movable jaw of the device against the stationary jaw.

With clamping devices of this kind, it is desirable to provide two clamping devices which are clamped in diametrically opposite position against the wall of the pile shaft or other tubular member at the trailing end thereof to avoid a decentered or eccentric application of the driving force. However, two such diametrically spaced clamping devices can be used only if the pile shaft or other tubular member to be driven has a certain minimum diameter since it is not possible to reduce the clamping devices below a definite size due to the powerful forces involved. If the member to be driven has less than the aforementioned minimum diameter, only a single clamping device can be used. This has the inherent disadvantage that the driving force will be applied decentrically in reference to the axis of the tube or shaft and hence unilaterally. Such unilateral application of the force may result in the breaking up of the tubular member during the driving operation.

It is a broad object of the invention to provide a novel and improved clamping device of the general kind above referred to with which a substantially centered driving force can be applied irrespective of the diameter of the member to be driven, or at least within a much wider range of diameter than was heretofore possible.

The aforementioned object, feature and advantage and other objects, features and advantages which will be pointed out hereinafter are attained by providing two levers, ends of which are pivotal into and out of clamping engagement with the outer wall of a tubular member to be driven. Each of the levers is pivotal about a shaft which is mounted on a suitable frame structure. The device further comprises two pressure members which are radially displaceable and engageable in clamping engagement with the inner wall of the tubular member. The two pressure members are disposed opposite to the ends of the lever engageable with the outside of the tubular member. The levers and the pressure members are simultaneously actuated by a suitable actuating means. This actuating means comprises two wedges which extend in the direction of the axis of the tubular member but in opposite direction. The two wedges can be displaced by a hydraulic means. One of the wedges pivots the levers and the other displaces the pressure members. The wedge which pivots the levers, is engaged by two connecting links which are disposed on opposite sides of said wedge and linked to the levers.

According to the preferred embodiment of the invention, the aforementioned frame structure is in the form of a cylindrical housing within which said hydraulic means is arranged. The hydraulic means preferably comprises a cylinder including a plunger which controls one of the wedges, the other wedge being controlled by the cylinder. The cylindrical housing mounts oppositely extending brackets, each of which mounts a pivot shaft for the respective lever.

When the hydraulic means is actuated by building up a fluid pressure therein, the two wedges are displaced in opposite directions. As a result, the pressure members are pressed against the inner wall of the tubular member and the levers are simultaneously pressed against the outside wall of the tube by the action of the links coupled with the respective wedge.

The invention will be more fully described in connection with the accompanying drawing in which an exemplification of the invention is shown by way of illustration and not by way of limitation.

Figure 2:
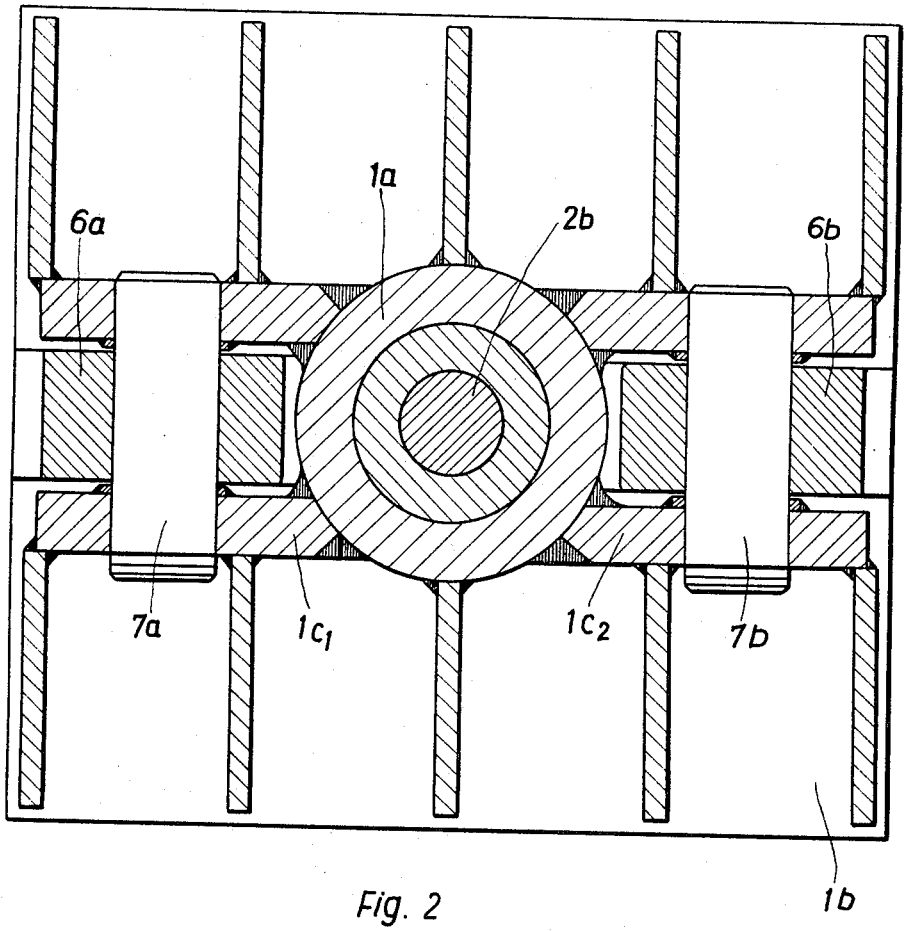

In the drawing:

FIG. 1 shows an elevational sectional view of a clamping device according to the invention; and FIG. 2 shows a cross sectional view of FIG. 1.

Referring now to the figures in detail, the exemplified clamping device comprises a frame structure shown as a cylindrical housing 1a from which extend diametrically opposite brackets or supports $1c_1$ and $1c_2$. The brackets, which may be made of sheet material, are preferably arranged in pairs, as it is clearly shown in FIG. 2, and are parallel to each other. They support bolts 7a and 7b which constitute stationary pivot axes for two-arm levers 6a and 6b respectively. One arm of each lever is engageable with the outer wall of a pile shaft 12 to be driven into the ground. Turning of the levers about the respective pivot axis is effected by a wedge 3b. This wedge is engaged on both sides by oppositely disposed connecting members 5a and 5b which are pivotally linked to bolts 9a and 9b respectively mounted on the arm of levers 6a and 6b.

Cylindrical housing 1a accommodates a hydraulic means which comprises a cylinder 2a slidably guided in the housing and including a plunger 2b. Wedge 3b engages cylinder 2a either directly or via interposed washers or similar means.

A second wedge 3a is secured to an extension of plunger 2b and is engaged on opposite sides with pressure members 4a and 4b. The two pressure members mount exchangeable jaws 11a and 11b respectively engageable with the inner wall of pile shaft 12. The gripping surfaces of jaws 11a and 11b are preferably serrated or otherwise roughened to increase the obtainable gripping force.

Levers 6a and 6b may also be equipped with exchangeable jaws 13a and 13b respectively. The use of exchangeable jaws on the levers and the pressure members has the advantage that the clamping device can be adjusted for clamping pile shafts or other tubular members having different diameters by simply exchanging the jaws.

When pressurized fluid, such as oil under pressure, is fed into cylinder 2a through a duct S, plunger 2b will exert pressure upon wedge 3a in the direction of arrow c.

The oil pressure will simultaneously displace cylinder 2a and with it wedge 3b in the direction of arrow d. As a result, wedge 3a spreads pressure members 4a and 4b further apart whereby the same are pressed against the inside wall of pile shaft 12. Similarly wedge 3b displaces connecting members 5a and 5b so that levers 6a and 6b are pivoted about shafts or bolts 7a and 7b respectively. Accordingly, jaws 11a and 11b on levers 6a and 6b are pressed against the outer wall of pile shaft 12 so that the same is gripped on the inside and the outside.

The wedge angle of wedges 3a and 3b and the transmission ratio of levers 6a and 6b are so selected that the pressure of outer jaws 13a and 13b against pile shaft 12 in the directions of g and h respectively are equal to the pressure of inner jaws 4a and 4b against the pile shaft in the directions a and b respectively.

To assure that not only pile shaft 12 is tightly clamped to the clamping device but that the clamping device itself is strongly and tightly secured to the vibrating driving device, a plate 8 is provided which abuts against connecting members 5a and 5b. Plate 8 is mounted very closely to a vibration transmitting plate 1b of a vibrating drive means which is not further shown, except by an outline, as it does not constitute part of the present invention.

As a result, displacement of wedge 3b does not only cause an outward movement of connecting members 5a and 5b in radial direction, but also a slight pivotal movement of these members about bolts 9a and 9b respectively, whereby plate 8 is tightly pressed against plate 1b.

Accordingly, the hydraulic means, when actuated, performs a dual function, namely to clamp the pile shaft at opposite sides of its wall and to clamp the entire clamping device to the vibrating driving device.

The most favorable conditions for pressing plate 8 against plate 1b are obtained when bolts 7a and 9a and also bolts 7b and 9b are substantially vertically above each other so that lines through the axes of the respective pairs of bolts are substantially parallel to the axis of pile shaft 12. Such spatial arrangement of the axes of the bolts assures that even a slight departure of connecting members 5a and 5b from a rectilinear displacement due to the movement of wedge 3b produces a lifting of plate 8 sufficient to press the same and with it the entire clamping device strongly against plate 1b of the driving device.

The clamping device is released from the pile shaft by feeding pressurized oil through a duct L. The oil pressure will then cause an upward movement of plunger 2b and with it of wedge 3a secured thereto. As a result, the clamping force with which pressure members 4a and 4b are pressed against the inner wall of tube 12 is relaxed. When plunger 2b has reached its upper end position, levers 6a and 6b will pivot about bolts 7a and 7b respectively due to the now present slight play between connecting members 5a and 5 b respectively and wedge 3b. The outer clamping jaws 13a and 13b are hence also loose so that pile shaft 12 can be pulled out of the clamping device.

As is evident, duct L serves as outlet for oil during the clamping operation and duct S as outlet during the release operation.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A clamping device for clamping a tubular member to be driven into the ground to a pile driving device, said clamping device comprising a pair of clamping levers, first mounting means pivotally supporting said levers for movement of the same into and out of engagement with circumferentially spaced outer wall portions of the tubular member to be clamped, said first mounting means including a generally cylindrical housing having brackets oppositely extending therefrom and a pivot shaft supported on each of said brackets, each of said shafts pivotally supporting one of said levers, a pair of pressure members, second mounting means movably supporting said pressure members for movement of the same into and out of clamping engagement with inner wall portions of said tubular member substantially opposite to said outer wall portions thereof, actuating means operatively coupled with said levers and said pressure members for simultaneously moving the same into and out of engagement with the respective wall portions of the tubular member, said actuating means including lengthwise displaceable wedges facing in opposite directions and disposed in substantial alignment with the axis of the tubular member when in clamping position, one of said wedges coacting with said levers for pivoting the same into and out of the clamping position thereof and the other wedge coacting with said pressure members for moving the same into and out of the clamping position thereof, and hydraulic means coacting with said wedges for simultaneously displacing the same respectively into positions effecting clamping by the levers and the pressure members and into positions in which the levers and the pressure members are released from the respective clamping position, said hydraulic means being disposed within said housing and including a cylinder slidable in the housing and a plunger slidable in the cylinder, said one wedge being coupled to the cylinder and said other wedge to the plunger for displacement of said one wedge by displacement of the cylinder in reference to the housing and displacement of said other wedge by displacement of the plunger in reference to the cylinder, and connecting means on the clamping device for securing the same to the pile driving device.

2. A clamping device according to claim 1 and comprising a frame structure, a pair of pivot shafts supported on said frame structure, said levers being pivotally supported on said shafts, and wherein said second mounting means support said pressure members radially displaceable in reference to the axis of the tubular member when in clamping position.

3. A clamping device according to claim 1, wherein said actuating means comprise lengthwise displaceable wedges facing in opposite directions and disposed in substantial alignment with the axis of the tubular member when in clamping position, one of said wedges coacting with said levers for pivoting the same into and out of the clamping position thereof and the other wedge coacting with said pressure members for moving the same into and out of the clamping positions thereof, and hydraulic means coacting with said wedges for simultaneously displacing the same respectively into positions effecting clamping of the tubular member by the levers and the pressure members and into positions in which the levers and the pressure members are released from the respective clamping position.

4. A clamping device according to claim 3, wherein connecting members are interposed between said one wedge and each of said levers, said connecting members being hinged to the levers for converting a lengthwise displacement of said one wedge into a pivotal movement of said levers.

5. A clamping device according to claim 1, wherein said means comprise a frame structure, a connecting plate movably supported on said frame structure for movement into and out of a force transmitting engagement with the frame, and means coacting with the levers and said one wedge to move said plate into and out of said force transmitting engagement.

6. A clamping device according to claim 5, wherein said last mentioned means comprise connecting members disposed on opposite sides of one wedge coacting with the levers, said connecting members being supported for rectilinear and pivotal movement and hinged to the levers, rectilinear displacement of the connecting members causing pivoting of the levers and pivotal movement of the connecting members causing movement of said connecting plate, the connecting members being rectilinearly displaced and pivoted in response to a lengthwise displacement of said one wedge by said hydraulic means.

7. A clamping device according to claim 6, wherein said pivot shafts supporting the levers and the rotational axes of the hinge connections between the levers and the connecting members are disposed in planes substantially parallel to the axis of the tubular member when the same is in position for clamping.

8. A clamping device according to claim 1 and comprising detachably mounted jaws on said levers and said pressure members.

References Cited

UNITED STATES PATENTS

| | | | |
|---|---|---|---|
| 2,494,166 | 1/1950 | Drissner | 279—16 |
| 2,613,943 | 10/1952 | Trudeau | 279—106 |
| 2,703,242 | 3/1955 | Sloan | 279—4 |
| 3,227,483 | 1/1966 | Guild | 294—88 |

ROBERT C. RIORDON, *Primary Examiner.*

D. R. MELTON, *Assistant Examiner.*